July 4, 1939.　　　T. PETERSEN　　　2,165,005
METHOD AND APPARATUS FOR FORMING CHEESE
Filed Jan. 31, 1938　　　3 Sheets-Sheet 1
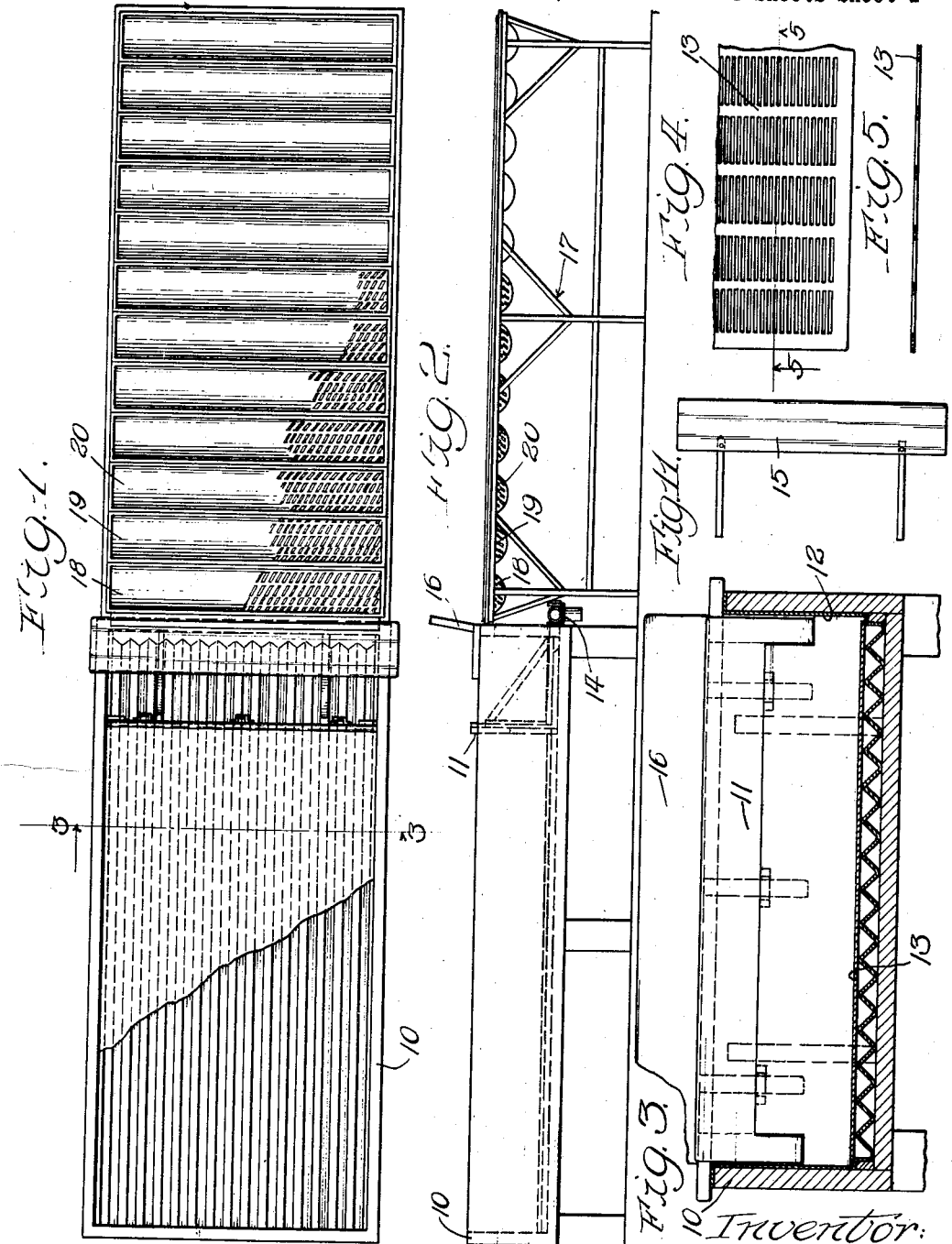
Inventor:
Thorkild Petersen,
By Chritton, Wiles, Davies, Hirsch & Vincent,
Attys

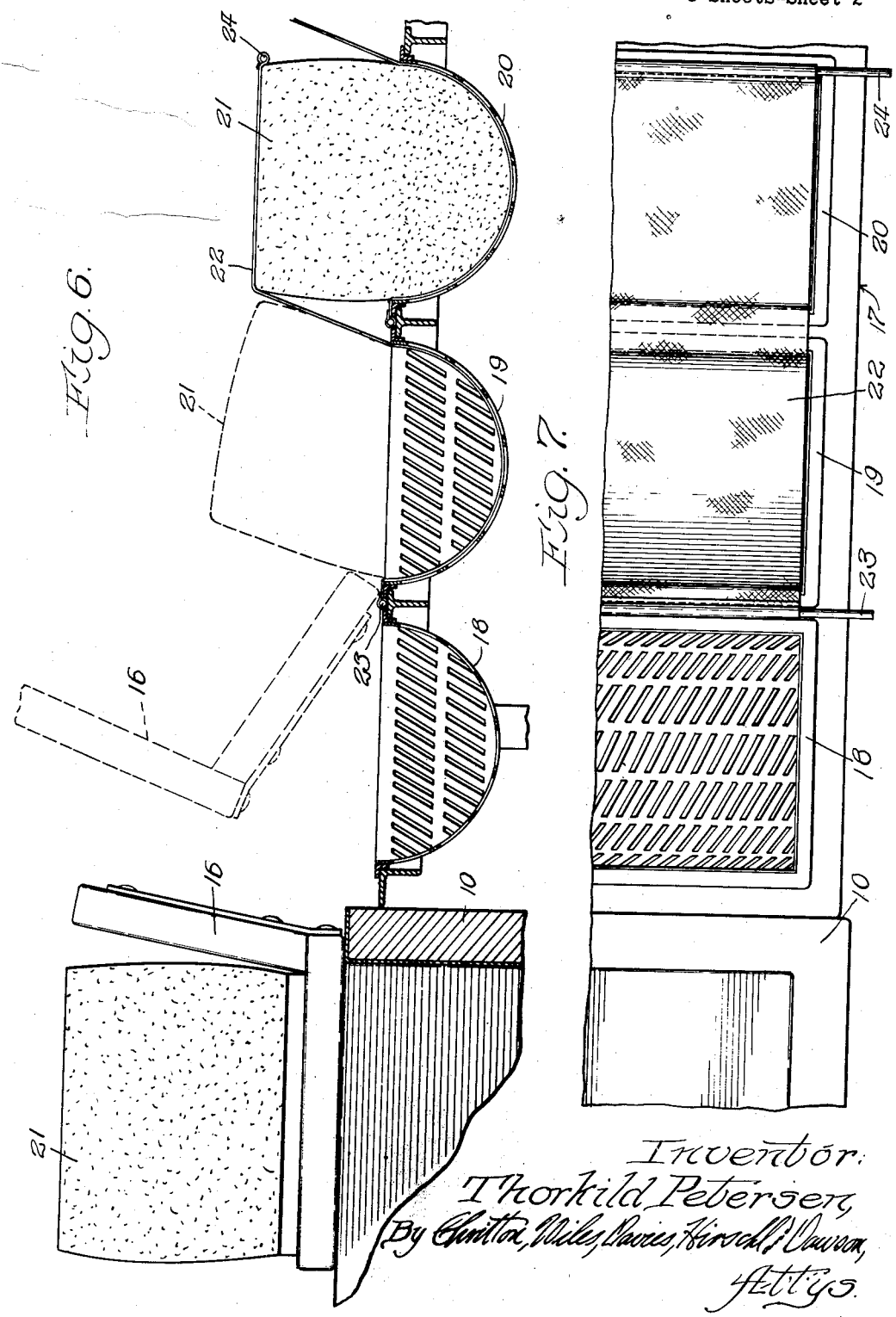

July 4, 1939.  T. PETERSEN  2,165,005
METHOD AND APPARATUS FOR FORMING CHEESE
Filed Jan. 31, 1938  3 Sheets-Sheet 3
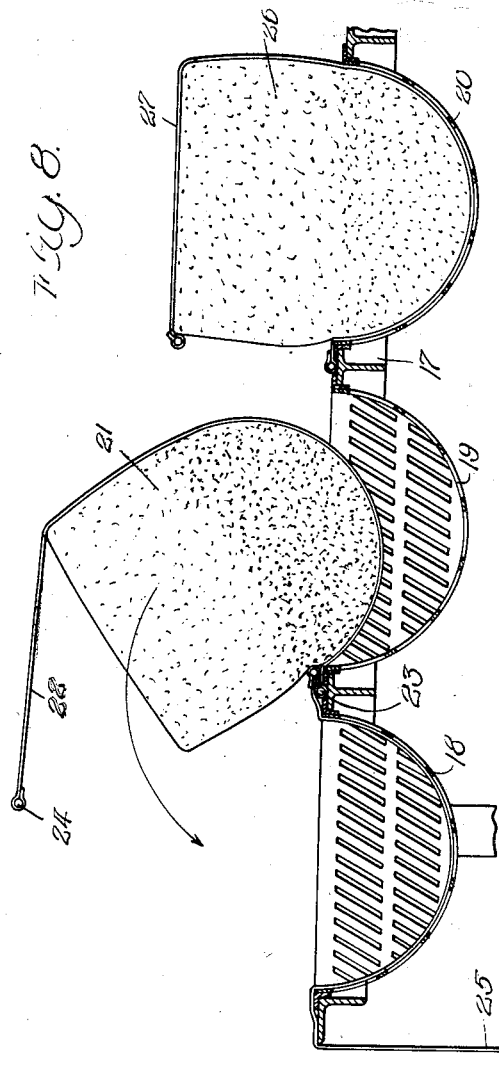
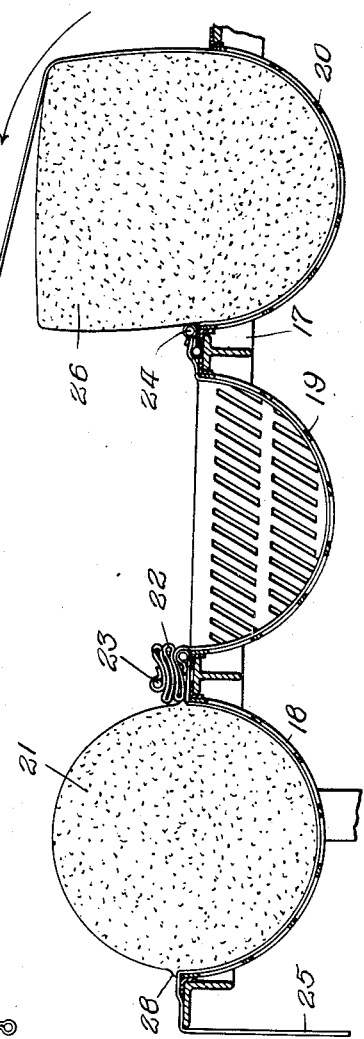
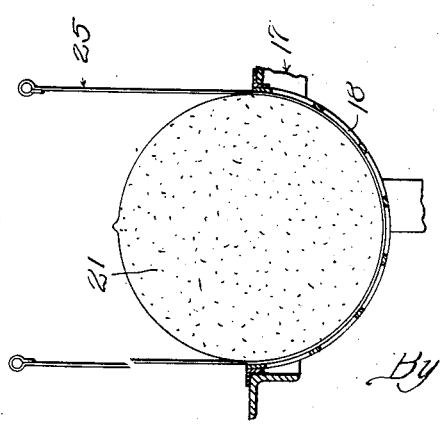
Inventor:
Thorhild Petersen, Patented July 4, 1939

2,165,005

UNITED STATES PATENT OFFICE 2,165,005

METHOD AND APPARATUS FOR FORMING CHEESE

Thorkild Petersen, Elgin, Ill., assignor to Pure Milk Cheese Company, a corporation of Illinois Application January 31, 1938, Serial No. 187,980

14 Claims. (Cl. 31—46)

This invention relates to a method and apparatus for forming cheese, and more particularly for forming blocks of partially drained curd into cylinders adapted to be cut into cheese wheels.

One feature of this invention is that it provides a simple and convenient means and method for forming a mass of partially drained cheese into a desired shape; another feature of this invention is that it provides an improved method and means for forming a natural cheese into a desired final form; yet another feature of this invention is that the the cheese curd may be formed into cylinders with a minimum of disturbance and shifting thereof; other features and advantages of this invention will be apparent from the following specification and the drawings, in which:

Figure 1 is a top plan view, partly broken away, of a settling vat and forming table; Figure 2 is a side elevation of the apparatus shown in Figure 1; Figure 3 is a transverse sectional view along the line 3—3 of Figure 1; Figure 4 is a fragmentary view of the perforated false bottom of the settling vat; Figure 5 is a transverse sectional view along the line 5—5 of Figure 4; Figure 6 is a partial sectional view showing the blocks of curd in the forming troughs; Figure 7 is an enlarged fragmentary top plan view of the device shown in Figure 6; Figure 8 is a vertical sectional view showing a step in the forming of the cheese; Figure 9 is a similar view showing another step; Figure 10 is a sectional view of a single trough showing the cheese mass partially rotated therein; and Figure 11 is a view of the cutting knife.

The formation of "processed" cheese into a final package shape is relatively simple, since such cheese may be poured, in a liquid state, into a mould of the desired size and shape and then allowed to set. The formation of natural cheese into the relatively small packages required or preferred by the majority of cheese buyers is, however, a much more difficult feat. That is, the cheese must be formed during draining into its final shape, and individual packages should not weigh more than a few pounds at the most. It has been found that the most convenient way of forming relatively small wheels is to form a cylinder of the same diameter as the desired finished wheels, but of a length equal to fifteen or twenty or more times the thickness of each desired finished wheel. This cylinder, after it has acquired a set or stiffness allowing convenient handling, may be readily cut transversely to form the desired wheels.

The present invention provides improved means for forming blocks of cheese curd, cut from a mass of partially drained curd in the bottom of a settling vat, into cylinders of the type adapted to be subsequently cut into wheels. This is done by placing the blocks in horizontal semicircular troughs, and shifting or overturning them during further draining, so that the lower side in contact with the trough settles against and substantially conforms to the shape of the trough.

In the particular embodiment of my invention illustrated, a settling tank or vat 10 is shown as having an internal width equal to the length of the desired cheese cylinder, and as having an effective length (governed by the movable dam or partition 11) equal to the combined thickness of any desired number of blocks, as say ten blocks. Each block, of course, has a thickness approximately equal to the desired diameter of the finished cylinder.

The tank 10 is here shown as having an outer or principal body portion of wood, and an inner lining or shell of stainless steel 12, the bottom being corrugated longitudinally, as may be particularly seen in Figure 3. The upper edges or apices of the corrugations support a false or drainage bottom comprising a single sheet of perforated metal 13, extending the full length and width of the tank. The details of the sheet may be seen from an examination of Figures 4 and 5, where the sheet will be seen to have therethrough a number of drainage slots or openings, permitting liquid to pass into the space beneath the false bottom 13, whence it may flow along the bottom of the tank and out the drain cock 14 provided at the end of the tank.

After the milk has been subjected to various steps incident to the making of the particular natural cheese desired, so that the solids therein have begun to coagulate, a large part of the whey may be removed therefrom by any convenient means. The remainder is then poured into the settling tank 10, where it is permitted to settle for a predetermined period, whey being drained off therefrom as desired through the cock 14. After the partially drained mass in the tank has begun to set, and to exhibit some stiffness, all of the whey that will readily drain therefrom is removed from the tank, and the partition 11 taken out. The knife 15, shown in Figure 11, is then inserted vertically into the mass, transversely of the tank, to cut off a block of the desired width. The knife 15 is then removed and inserted under the block from the end of the tank where the partition 11 has been removed, it being understood that the first block cut is the one adjacent this end. Workmen then use the knife to lift the block out of the tank and place it on the carrying board 16.

Immediately adjacent the tank 10, and placed in end to end relationship thereto during transfer of the blocks from the tank, is a forming table 17 comprising a supporting framework carrying a plurality of horizontal semi-circular drainage troughs, fixedly mounted on the table in side-by-side relationship. These troughs are all of sheet metal with drainage openings stamped or cut therethrough, the twelve here shown being identical in all respects. The first three on the end of the forming table adjacent the tank 10 are here referred to as 18, 19 and 20; inasmuch as a description of the practicing of the process in these three troughs is merely expanded similarly in the other troughs, no reference numerals will be applied to the remainder thereof.

Referring more particularly to Figures 6 to 10, the forming of the block of partially drained curd 21, shown in Figure 6 on the carrying board 16, will be described in more detail. The carrying board is overturned, as shown in dotted lines in Figure 6, to place the block of curd 21 in the trough 19. The block is allowed to settle and continue draining in this trough 19 for a short period, say from five to fifteen minutes. This period is sufficient to cause the bottom of the block 21 to substantially conform to the semi-circular shape of the trough. The block is then overturned to bring the side which was uppermost in Figure 6 into contact with the bottom of a trough, so that this side will also be caused to conform to the trough shape.

While this shifting or overturning of the block may be done in the same trough if desired, it is preferably accomplished as illustrated in Figure 8, by overturning the block 21 into the trough 18 adjacent it.

While this overturning may be accomplished in any convenient way, the means for effecting it is here shown as a sheet 22 of pliant, porous material, such as a rather heavy, loosely woven cloth. Each sheet has a length equal to the length of the troughs, and a width approximately equal to the periphery of the cheese blocks laid therein. The sheets are rectangular in shape, and along two of the edges hems are formed and metal rods inserted therethrough, as the rods 23 and 24, to provide convenient handling. That is, it is only necessary for a workman on each side of the table to grasp the rod 24 and pull the sheet up and toward the tank, as shown in Figure 8, to cause the cheese block 21 to overturn into the adjacent trough. It is to be understood, of course, that a sheet is laid over each trough, as illustrated in Figure 7, for example, before the block of cheese is tipped into it by the carrying board. Similarly, another sheet is laid in the adjacent trough, as the sheet 25 in the trough 18, before the block 21 is overturned therein.

The position of the block 21 after it has been overturned into the trough 18 and allowed to drain for a further period is shown in Figure 9, the now bottom side of the block having substantially conformed to the semi-circular shape of this trough. The cloth or sheet 22 is then laid back in position in the trough 19, and another block of cheese in the adjacent trough 20, as block 26, is similarly overturned into trough 19, as by manipulation of the sheet 27. That is, when the blocks are moved one by one from the settling tank, all of the troughs in the table 17 would be filled except the trough 18, for example. Then when the block 21 is overturned from the trough 19 into the trough 18, the block 26 would be overturned from the trough 20 into the trough 19, the block in the next adjacent trough overturned into the trough 20, and so on. Again the blocks would be allowed to further drain for a time sufficient to allow them to conform to the trough shape, as another five to fifteen minutes. Each block is then partially rotated or shifted within the same trough in order to remove any slight ridge or imperfection in the shape which might exist near the edge of the trough. As illustrated in Figure 10, the block 21 would be turned through a partial rotation, as a quarter of a turn, so that the ridge shown as 28 at the left-hand edge of the trough 18 in Figure 9 would be smoothed out by being brought to the bottom of the trough. If desired, a further partial rotation can be made to eliminate the ridge shown at the top of the cylinder 21 in Figure 10.

After the cylinders have been formed in this manner they may be cut into wheels in any conventional way. For example, a cutting rack comprising a plurality of parallel cutting wires may be placed over an adjacent empty trough, and the cylinder shifted into this trough through the rack, so that the cutting wires separate it into wheels. These wheels may be then removed by hand, pressed, cured, and any other steps desired taken up to the final way of packaging. The form of the wheel, however, does not change during any of these subsequent steps; the wheels being fully formed in the apparatus and by the process shown and described heretofore.

While I have described and claimed certain embodiments of my invention it is to be understood that it is capable of many modifications. Changes, therefore, in the construction and arrangement may be made without departing from the spirit and scope of the invention as disclosed in the appended claims in which it is my intention to claim all novelty inherent in my invention as broadly as permissible in view of the prior art.

I claim:

1. Apparatus of the character described for forming blocks of partially drained cheese curd into cylinders adapted to be cut into wheels, including: a plurality of horizontal semi-circular troughs having drain openings therethrough; means supporting said troughs in fixed adjacent relationship; and means for shifting said blocks in said troughs during further draining thereof.

2. Apparatus of the character described for forming blocks of partially drained cheese curd into cylinders adapted to be cut into wheels, including: a plurality of horizontal semi-circular troughs having drain openings therethrough; means supporting said troughs in fixed adjacent relationship; and means for overturning said blocks in said troughs during further draining thereof.

3. Apparatus of the character described for forming blocks of partially drained cheese curd into cylinders adapted to be cut into wheels, including: a plurality of horizontal semi-circular troughs having drain openings therethrough; means supporting said troughs in fixed side by side relationship; and means for shifting said blocks from one trough to another during further draining thereof.

4. Apparatus of the character claimed in claim 3, wherein said last mentioned means overturns said blocks during such shifting.

5. Apparatus of the character claimed in claim 3, wherein said last mentioned means comprises a sheet of pliant, porous material between each block and trough.

6. Apparatus of the character claimed in claim 1, wherein said shifting means is a sheet of pliant, porous material beneath each block of a length equal to that of said block and a width approximately equal to the circumference of said block.

7. Apparatus of the character claimed in claim 1, wherein said shifting means is a sheet of pliant, porous material beneath each block, each sheet having rods attached thereto along at least one edge thereof.

8. Apparatus of the character described for forming blocks of partially drained cheese curd into cylinders adapted to be cut into wheels, including: a plurality of identical semi-circular troughs having drain openings therethrough; means for supporting said troughs horizontally in fixed side by side relationship; and a sheet of pliant, porous material, having rods attached thereto along two edges thereof, between each block and the trough in which it lies and adapted to shift said block during further draining thereof.

9. The process of forming a block of partially drained cheese curd into a cylinder, including: placing said block in a non-rotatable semi-circular drain trough; permitting said block to drain for a period; shifting the position of said block around its longitudinal axis; and permitting said block to drain for a further period.

10. The process of forming a block of partially drained cheese curd into a cylinder, including: placing said block in a fixedly supported semi-circular drain trough; permitting said block to drain for a period; overturning said block into another fixedly supported trough; and permitting said block to drain for a further period.

11. The process of forming a block of partially drained cheese curd into a cylinder, including: placing said block in a semi-circular drain trough; permitting said block to drain for a period; overturning said block into another trough; permitting said block to drain for a further period; and partially rotating said block in said second trough.

12. The process of forming a mass of partially drained cheese curd into a cylinder adapted to be cut into wheels, including: cutting a block from said curd; placing said block in a fixedly supported semi-circular drain trough; permitting said block to drain therein for a period sufficient to cause the lower portion thereof to substantially conform to the shape of said trough; overturning said block; and permitting it to drain for a further period sufficient to cause the then lower portion to substantially conform to the trough shape.

13. The process of forming a mass of partially drained cheese curd into a cylinder adapted to be cut into wheels, including: cutting a block from said curd; placing said block in a fixedly supported semi-circular drain trough; permitting said block to drain therein for a period sufficient to cause the lower portion thereof to substantially conform to the shape of said trough; overturning said block into a second fixedly supported trough; and permitting it to drain for a further period sufficient to cause the then lower portion to substantially conform to the trough shape.

14. The process of forming a mass of partially drained cheese curd into a cylinder adapted to be cut into wheels, said process being performed in a plurality of fixedly supported open troughs, including: cutting a block from said curd; placing said block in a semi-circular drain trough; permitting said block to drain therein for a period sufficient to cause the lower portion thereof to substantially conform to the shape of said trough; overturning said block into a second identical trough; permitting it to drain for a further period sufficient to cause the then lower portion to substantially conform to the trough shape; and partially rotating said block in said last mentioned trough.

THORKILD PETERSEN.